United States Patent
Ibryam

(10) Patent No.: US 11,706,280 B2
(45) Date of Patent: Jul. 18, 2023

(54) METHODS AND SYSTEM FOR AUDITING BATCH JOBS USING BLOCKCHAIN

(71) Applicant: Red Hat, Inc., Raleigh, NC (US)

(72) Inventor: Bilgin Ismet Ibryam, London (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/356,730

(22) Filed: Mar. 18, 2019

(65) Prior Publication Data

US 2020/0304559 A1 Sep. 24, 2020

(51) Int. Cl.
| | |
|---|---|
| H04L 29/08 | (2006.01) |
| H04L 29/06 | (2006.01) |
| H04L 9/06 | (2006.01) |
| H04L 67/06 | (2022.01) |
| H04L 67/01 | (2022.01) |
| H04L 9/00 | (2022.01) |

(52) U.S. Cl.
CPC ............ H04L 67/06 (2013.01); H04L 9/0643 (2013.01); H04L 67/01 (2022.05); *H04L 9/50* (2022.05)

(58) Field of Classification Search
CPC ....... H04L 67/06; H04L 9/0643; H04L 67/42; H04L 2209/38; H04L 29/08; H04L 9/06; H04L 29/06; H04L 67/01; H04L 9/50; H04L 67/104; H04L 9/3239; H04L 9/00; H04L 9/32
USPC ........................................................ 709/203
See application file for complete search history.

(56) References Cited

U.S. PATENT DOCUMENTS

| | | |
|---|---|---|
| 10,114,980 B2 | 10/2018 | Barinov et al. |
| 2017/0163733 A1 | 6/2017 | Grefen et al. |
| 2018/0096752 A1* | 4/2018 | Ovalle .................... H04W 4/60 |
| 2018/0157700 A1 | 6/2018 | Roberts et al. |
| 2018/0189333 A1* | 7/2018 | Childress .............. H04L 9/3236 |
| 2018/0276626 A1* | 9/2018 | Laiben ................... G06Q 20/02 |
| 2018/0287797 A1 | 10/2018 | Banerjee et al. |
| 2018/0329945 A1* | 11/2018 | Horii ....................... G06F 9/466 |
| 2019/0068615 A1* | 2/2019 | Pack ..................... H04L 9/3236 |
| 2019/0188657 A1* | 6/2019 | Arora ................... G06Q 20/401 |

(Continued)

FOREIGN PATENT DOCUMENTS

| | | | | |
|---|---|---|---|---|
| WO | WO/2018/087493 | * | 5/2018 | ............. G06F 21/10 |
| WO | 2018087493 | | 6/2018 | |

OTHER PUBLICATIONS

Sribalaji, et al., "Secure and Decentralized File Transfer Applications Using Blockchain", International Journal of Current Engineering and Scientific Research (IJCESR), vol. 4, Issue 4, Published 2017, pp. 169-175.

(Continued)

*Primary Examiner* — Tonia L Dollinger
*Assistant Examiner* — Mehulkumar J Shah
(74) *Attorney, Agent, or Firm* — K&L Gates LLP

(57) ABSTRACT

Systems and methods for auditing batch jobs with blockchain transactions are provided. In one embodiment, a method is provided that includes running a batch job on a client machine to download one or more files from a server machine to the client machine and determining a batch job result of the batch job. The method may further include generating a batch result transaction at the client machine. The batch result transaction may include the batch job result. In certain embodiments, the method may proceed with adding the batch result transaction to the blockchain.

18 Claims, 6 Drawing Sheets

(56) References Cited

U.S. PATENT DOCUMENTS

| | | | |
|---|---|---|---|
| 2019/0295078 A1* | 9/2019 | Bae | G06F 16/1824 |
| 2019/0370058 A1* | 12/2019 | Gupta | G06F 9/4881 |
| 2020/0044856 A1* | 2/2020 | Lynde | H04L 9/0618 |
| 2020/0082361 A1* | 3/2020 | Chan | H04L 9/3247 |
| 2020/0117690 A1* | 4/2020 | Tran | G06F 16/90332 |
| 2020/0119904 A1* | 4/2020 | Philyaw | H04L 63/105 |
| 2020/0252457 A1* | 8/2020 | Zakrzewski | H04L 9/3213 |
| 2020/0265516 A1* | 8/2020 | Xu | H04L 9/3247 |
| 2020/0287706 A1* | 9/2020 | Li | H04L 9/3239 |

OTHER PUBLICATIONS

Taylor, "An Introduction to Blockchain and its Potential Impact on Business and Auditing", National Rural Electric Cooperative Association, Published Aug. 6, 2018; (58 pages).

Unknown, "Hash file contents and metadata and then store on chain when a file is uploaded to a FTP server", https://github.com/Azure-Samples/blockchain/tree/master/blockchain-development-kit/accelerators/attestable-documents-and-media/blockchain-workbench/ftp, Retrieved Feb. 21, 2019; (18 pages).

\* cited by examiner

METHODS AND SYSTEM FOR AUDITING BATCH JOBS USING BLOCKCHAIN

BACKGROUND

Organizations often need to extract or exchange data over computer networks. For example, companies may need to exchange data between one another (e.g., in a sales relationship). As another example, departments within a single company may need to exchange data or a single department may need to collect data to prepare a report. This data may be too large to exchange over conventional communication systems such as email, so the data may instead be exchanged using file exchange protocols.

SUMMARY

The present disclosure presents new and innovative systems and methods for auditing batch jobs with blockchain transactions. In one embodiment, a method is provided comprising running a batch job on a client machine to download one or more files from a server machine to the client machine and determining a batch job result of the batch job. The method may further comprise generating, at the client machine, a batch result transaction including the batch job result and adding the batch result transaction to a blockchain.

In another embodiment, a system is provided comprising a processor and a memory. The memory may store instructions which, when executed by the processor, cause the processor to run a batch job to download one or more files from a server machine and determine a batch job result of the batch job. The method may store further instructions which, when executed by the processor, cause the processor to generate a batch result transaction including the batch job result and add the batch result transaction to a blockchain.

In a further embodiment, a non-transitory, computer-readable medium is provided storing instructions which, when executed by a processor, cause the processor to run a batch job to download one or more files from a server machine and determine a batch job result of the batch job. The non-transitory, computer-readable medium may store further instructions which, when executed by a processor, cause the processor to generate a batch result transaction including the batch job result and add the batch result transaction to a blockchain.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
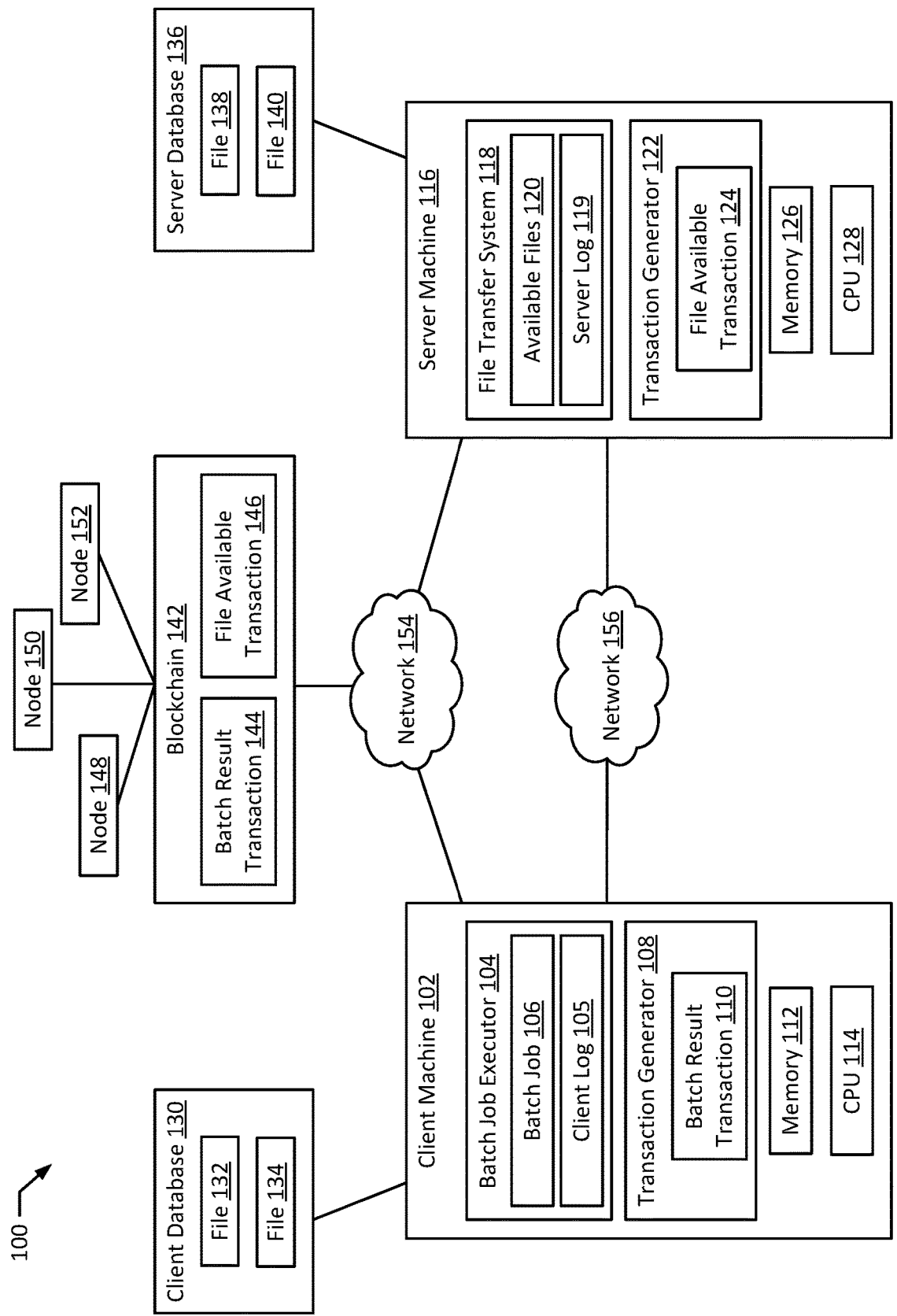
FIG. 1 illustrates a system according to an exemplary embodiment of the present disclosure.

One way that organizations exchange data is through file exchange protocols controlled by batch jobs. The batch jobs may be configured to run at regular intervals (e.g., every evening at a specific time) or when specified events happen (e.g., new data is generated or available on a server). Issues may arise while executing the batch jobs. For example, connectivity issues between the organizations may prevent transfer of the files and nonresponsiveness or unavailability of a server providing the files may prevent transfer. Similarly, if the batch job runs at the wrong time (e.g., too early or too late), the files may not yet be available or may no longer be available on the server.

When a batch job fails to successfully complete due to these reasons or other reasons, it can be difficult to audit and coordinate between the two organizations to determine the cause of the error. For example, in a data exchange, one organization may own the database and the other organization may pull files or data from the database at regular intervals as agreed. Therefore, the log files corresponding to the failed batch job may be distributed between both organizations, with the server-side logs stored within the database-owning organization and the client-side logs stored within the batch job-running organization.

To reach a consensus on the issues that caused the batch job to fail, both organizations must typically access and review both sets of logs and agree on the authenticity of the other party's provided log. Such a review typically takes place via less-formal communication channels, such as email, and may therefore require significant time, as the parties must exchange and validate one another's logs.

One way to solve this problem is to generate and store information regarding the success of attempted batch jobs in a publicly-available manner. For example, information regarding the execution of a batch job may be stored on a blockchain that can be viewed by both organizations. In particular, the organization or machine responsible for downloading files may determine a result of an attempted batch job and may incorporate the result into a transaction for upload to a blockchain. The transaction may also include additional information that may be used to verify the authenticity of the determined batch job result. For example, the received files may be hashed to create a file hash for inclusion within the transaction.

In certain cases, the server-side organization may also generate one or more transactions for storage on the blockchain. For example, the server-side organization may indicate to the downloading organization that the file is available for download by generating a file available transaction in storing the file available transaction on the blockchain. Similarly, a server machine providing the files for download may monitor the process of the download and may generate a transaction indicating the server-side result of responding to the batch job file transfer requests.

In such a system, one or both organizations may provide publicly-available records of the result of file exchange operations or file manipulation operations (e.g., making files available for download), enabling the organizations to analyze the same records and determine whether an error occurred and to more efficiently gather information regarding the error. Rather than relying on the privately-maintained records, the organizations may analyze the transaction stored on the blockchain for information that may help detect and diagnose the issue without requiring costly and time intensive ad hoc coordination between both organizations.

FIG. 1 depicts a system 100 according to an exemplary embodiment of the present disclosure. The system 100 may be used to transfer files according to a file exchange protocol according to batch jobs and to upload transactions reflecting the completion and performance of the batch jobs. The system 100 includes a client machine 102 and a server machine 116 connected via the network 156. The client machine 102 includes a batch job executor 104 containing a batch job 106, a transaction generator 108 containing a batch result transaction 110, a memory 112, and a CPU 114. The server machine 116 includes a file transfer system 118 storing available files 120, a transaction generator 122 containing a file available transaction 124, a memory 126, and CPU 128. The client machine 102 and the server machine 116 further connected to one another and to a blockchain 142 via the network 154. The blockchain 142 stores a batch result transaction 144 and a file available transaction 146. The blockchain 142 is implemented by the nodes 148, 150, 152. A client database 130 is connected to the client machine 102 and a server database 136 is connected to the server machine 116. The client database 130 stores files 132, 134 and the server database 136 stores files 138, 140.

One or more of the client machine 102, the server machine 116, the client database 130, the server database 136, and the nodes 148, 150, 152 may be implemented by a computer system. For example, the CPU 114 and the memory 112 may implement one or more features of the client machine 102, such as the batch job executor 104 and the transaction generator 108. As another example, the CPU 128 and the memory 126 may implement one or more features of the server machine 116, such as the file transfer system 118 and the transaction generator 122. In the above examples, the memories 112, 126 may store one or more instructions which, when executed by the CPUs 114, 128, may cause the CPUs 114, 128 to perform one or more of the above-described functions. Further, although corresponding CPUs and memories are not depicted for the client database 130, the server database 136, and the nodes 148, 150, 152, each of these components may similarly include one or more CPUs or memories responsible for implementing one or more operational features.

The server machine 116 may be configured to store and provide files for exchange via a file exchange protocol implemented by the file transfer system 118. For example, the file transfer system 118 may store available files 120 that are available for download or exchange with client machines, such as the client machine 102. The available files 120 may be stored directly within the server machine 116, or within a database connected to the server machine 116, such as the server database 136. For example, one or more of the files 138, 140 stored within a server database 136 may be available files 120 for transfer with the file transfer system 118. The file transfer system 118 may be responsible for maintaining a log of attempted and successful file transfers according to the file exchange protocol. For example, the file transfer system 118 may maintain a server log 119 of records for each file transfer request received from the client machine 102, the available files 120 requested, and the result of the requested transfer.

The client machine 102 may be configured to run batch jobs 106 using a batch job executor 104 to download and/or receive available files 120 from the server machine 116 according to a file exchange protocol. For example, as described above, the batch jobs 106 may execute at regular intervals, or upon performance of the preceding action. Batch jobs 106 may be configured to download the available files 120 according to an existing arrangement between multiple organizations. For example, one organization may be responsible for implementing the client machine 102, while another organization may be responsible for implementing the server machine 116. The organizations may include different companies, different departments, or different groups within the same company. In other implementations, the client machine 102 in the server machine 116 table implemented by a single entity (e.g., where the entity is exchanging files between more than one computer system). The batch job 106 may specify details regarding the server machine 116 and/or credentials of the client machine 102 for use in downloading the available files 120 from the file transfer system 118. The batch job executor 104 may execute the batch jobs 106 according to an agreed file exchange protocol with the server machine 116. The file exchange protocol may include one or more of the file transfer protocol (FTP), the file transfer protocol secure (FTPS), the secure shell file transfer protocol (SFTP), the Windows® shared file system, and the Samba protocol. After downloading the available files 120 using the batch job executor 104, the client machine 102 may store the downloaded files within the client database 130 for future use. For example, files 132, 134 may correspond to one or more of the available files 120 downloaded by the client machine 102 from the server machine 116.

The client machine 102 may download the available files 120 from the server machine 116 over the network 156. The network 156 may be implemented as a public or private network and the client machine 102 and the server machine 116 may connect to the network 156 using one or more wired or wireless communication interfaces (e.g., Ethernet, Wi-Fi, cellular data, and/or Bluetooth connections).

The batch job executor 104 may be responsible for maintaining a client log 105 of attempted batch jobs 106. For example, for each batch job 106 executed or attempted to be executed, the batch job executor 104 may record an execution attempt and information regarding the result of the attempted execution. As a further example, the batch job executor 104 may record a download result of the batch job 106 indicating the result of an attempted download of one or more of the available files 120, a validation result of the batch job 106 indicating a result of performing one or more validation tests on the received files from the server machine 116, and a processing result of the batch job 106 indicating processing steps attempted or taken with the received files from the server machine 116.

For each attempted batch job 106, the client machine 102 may generate and upload a batch result transaction 110 using the transaction generator 108. The batch result transaction 110 may include one or more pieces of information regarding the attempted batch job execution, similar to the information that may be recorded by the client log 105 maintained by the batch job executor 104. After generating the batch result transaction 110, the transaction generator 108 may upload the batch result transaction 110 for storage on the blockchain 142.

Similarly, when new available files 120 are available in the file transfer system 118, the transaction generator 122 may generate and upload a file available transaction 124 to the blockchain 142. The file available transaction 124 may indicate information regarding the available files 120, e.g., file names, relevant organizations for the files, and types of files. After generating the file available transaction 124, the transaction generator 122 may upload the file available transaction 124 to the blockchain 142 for storage.

The blockchain 142 stores batch result transactions 144 and file available transactions 146. For example, the blockchain 142 may receive and store a batch result transaction 110 from the client machine 102 and a file available transaction 124 from the server machine 116. Further, although not depicted in FIG. 1, the blockchain 142 may store additional types of transactions as discussed below in connection with FIG. 2. The blockchain 142 is implemented by one or more nodes 148, 150, 152. The nodes 148, 150, 152 may be independent computing devices configured to store the transactions of the blockchain 142 and to verify new transactions according to a consensus algorithm. For example, the nodes 148, 150, 152 may verify newly-uploaded transactions according to a proof of work consensus algorithm, a proof of stake consensus algorithm, or any other consensus algorithm. In certain implementations, the blockchain 142 may be a private blockchain and the nodes 148, 150, 152 may be implemented by one or both of the organizations affiliated with the client machine 102 and the server machine 116. In another example, the blockchain 142 may be implemented by a publicly-available blockchain, such as the Bitcoin blockchain or the Ethereum® blockchain.

The blockchain 142 is connected to the client machine 102 and the server machine 116 via the network 154. The network 154 may be implemented as a public or private network, such as a private local area network (LAN), the Internet, or a secured channel over a public network. Similar to the network 156, the client machine 102 and the server machine 116 may be connected to the network 154 by one or more wired or wireless communication interfaces (e.g., Ethernet, Wi-Fi, cellular data, or Bluetooth connections). In certain implementations, the network 156 and the network 154 may be implemented by a single network connection. For example, where the available files 120 are exchanged over a private network connection 156 and the blockchain is privately implemented, the networks 154, 156 may be implemented by a single, private network connection. In another example, where the available files 120 are exchanged over a private network 156, but the blockchain 142 is a publicly-available blockchain, the network 156 may be implemented by a private network, whereas the network 154 may be implemented by a public network, such as the Internet.

Figure 2:
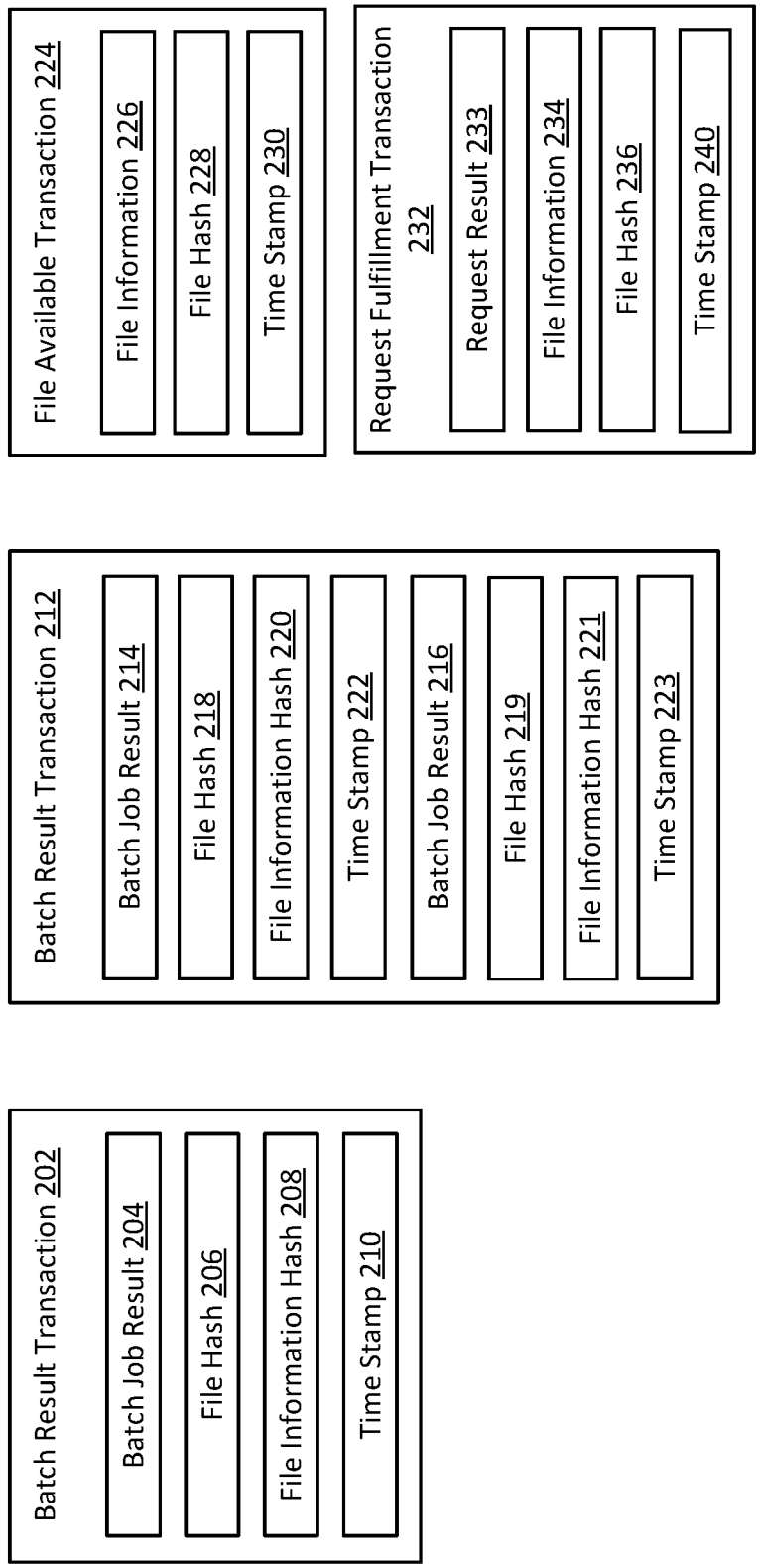
FIG. 2 illustrates transactions according to exemplary embodiments of the present disclosure.

FIG. 2 depicts a plurality of transactions 200 according to an exemplary embodiment of the present disclosure. The plurality of transactions 200 includes batch result transactions 202, 212, a file available transaction 224, and a request fulfillment transaction 232. The plurality of transactions 200 may correspond to transactions 110, 124, 144, 146 utilized in the system 100. For example, the batch result transactions 202, 212 may correspond to the batch result transaction 110 generated by the transaction generator 108 and/or the batch result transaction 144 stored on the blockchain. As another example, the file available transaction 224 may correspond to the file available transaction 124 generated by the transaction generator 122 to the server machine 116 and/or the file available transaction 146 stored on the blockchain 142. Similarly, although not depicted in FIG. 1, the request from a transaction 232 may also be generated by the transaction generator 122 and stored on the blockchain 142 as described in greater detail below.

The batch result transaction 202 includes multiple pieces of information 204, 206, 208, 210 that may be used to verifiably identify a particular attempted batch job 106 and to indicate a corresponding result of the identified batch job 106. The batch result transaction 202 may be generated by the transaction generator 108 in response to an attempted batch job 106. For example, after the batch job executor 104 attempts to execute batch job 106, it may determine a batch job result 204 of the batch job 106. The batch job result 204 may identify the attempted batch job 106 and the corresponding result of the attempted execution. For example, the batch job result 204 may indicate a successful execution of the batch job 106 and download of the corresponding available files 120 from the server machine 116. As another example, the batch job result 204 may indicate an unsuccessful execution of the batch job 106 and may identify one or more errors that occurred during the batch job 106 (e.g., a server error of the server machine 116, a network error of the network 156, a file corruption error of the received files, a file access error when accessing the available files 120). The batch job result 204 may also indicate one or more of a download result, a verification result, and a processing result of the received files from the server machine 116. The batch job executor 104 may then pass the batch job result 204 to the transaction generator 108 for inclusion within the batch result transaction 202. If the batch job 106 was successfully completed, the transaction generator 108 may calculate a file hash 206 of the available files 120 received during the execution of the batch job 106.

The file hash 206 may be generated by performing a hash algorithm (e.g., a secure hash algorithm (SHA), a message digest (MD) hashing algorithm) on one or more of the available files 120. For example, the file hash 206 may be calculated by performing the hash algorithm on all of the available files 120 received during the batch job 106, individually or collectively. In another example, where performing the hash algorithm on all of the available files 120 would be computationally burdensome or would produce too long of a processing delay, a subset of the available files 120 may be processed by the hash algorithm to create the file hash 206. In still further embodiments, a subset or portion of each of the available files 120 (e.g., the first 4 megabytes, the last 4 megabytes, both the first 4 megabytes and the last 4 megabytes) may be processed by the hash algorithm to create the file hash 206. The selected hash algorithm may generate a unique file hash 206 for each file or collection of files that it hashes. Accordingly, the file hash 206 may be used to verify the available files 120 corresponding to the batch result transaction 202. Additionally, if the file hash 206 calculated by the client machine 102 differs from a file hash calculated by the server machine 116 for the same files, it may be determined that one or more of the files has an error or was corrupted during the batch job 106 execution.

The file information hash 208 may similarly be calculated using file information (e.g., file metadata) corresponding to the available files 120 received during execution of the batch job 106. In certain implementations, the file information hash 208 may be calculated based only on the file metadata. The file information may be hashed using the same or similar hash algorithm is the file hash 206. Similar to the file hash 206, the file information hash 208 may be used to verify the file information of the files to which the batch result transaction 202 corresponds.

In certain implementations, the batch result transaction 202 may only include one of the file hash 206 and file information hash 208. For example, for batch jobs 106 corresponding to available files 120 that are to large to hash in their entirety, the file information hash 208 may alternatively be included within the batch result transaction 202. In other embodiments, the batch result transaction 202 may include both the file hash 206 and the file information hash 208, as depicted. In still further implementations, the file hash 206 and file information hash 208 may be combined. For example, the available files 120 and the file information may both be processed together by the hash algorithm to form a single file and file information hash. In cases where only a portion of the available files 120 is successfully downloaded prior to failure of the batch job 106 execution, the file hash 206 and/or the file information hash 208 may be calculated based on the received files to enable verification of at least the received files.

The batch result transaction 202 may additionally include a time stamp 210 corresponding to an attempted time of execution of the batch job 106 or other pertinent times (e.g., time of successful completion, time of failure, and/or time of download for one or more of the available files 120). In other implementations, the time stamp 210 may reflect the time of creation of the batch result transaction 202.

The batch result transaction 212 may be generated by the transaction generator 108 to correspond to more than one attempted batch job 106. For example, in implementations where the transaction generator 108 is configured to generate and upload transactions to the blockchain 142 slower than the batch job executor 104 is configured to execute batch jobs 106, the batch job executor 104 may execute more than one batch job 106 before a batch result transaction 212 is generated by the transaction generator 108. In such implementations, the transaction generator 108 may generate one batch result transaction 202 for each batch job 106 executed by the batch job executor 104. In other implementations, the transaction generator 108 may calculate a batch result transaction 212 corresponding to the multiple batch jobs 106 executed by the batch job executor 104. For example, the batch result transaction 212 may correspond to two batch jobs 106 executed by the batch job executor 104. Accordingly, the batch result transaction 212 includes two versions of each piece of information included within the batch result transaction 202. For example, the batch job result 214, the file hash 218, the file information hash 220, and the time stamp 222 may correspond to a first batch job 106, and the batch job result 216, the file hash 219, the file information hash 221, and the time stamp 223 may correspond to a second batch job 106. Each of these pieces of information may be generated as discussed above in connection with the batch result transaction 202.

The transaction generator 122 of the server machine 116 may generate the file available transaction 224 when new available files 120 are available within the file transfer system 118. The file available transaction 224 may include file information 226 identifying the available files 120. For example, the file information 226 may identify one or more pieces of file metadata (e.g., file names, file sizes, file storage hierarchies). As another example, the file information 226 may identify the corresponding party for whom the available files 120 are intended. In certain implementations, the organization implementing the server machine 116 may have file transfer arrangements with multiple parties. Accordingly, it may be necessary to indicate the party for whom a given set of available files 120 is intended. Therefore, the file information 226 may identify the corresponding party using, e.g., a username, entity name, agreement identifier, or other indicator.

The file available transaction 224 may include a file hash 228 of the available files 120. As described above, in implementations where the available files 120 are too large, the file hash 228 may be calculated based on a subset of the available files 120. In certain implementations, the file available transaction 224 may include multiple file hashes 228. For example, the file available transaction 224 may include a first file hash 228 calculated based on all of the available files 120 and a second file hash 228 based on a subset of the available files 120. Such implementations may enable verification of received files if the client machine 102 only calculates a file hash of a subset of the available files 120 or all of the available files 120. The file available transaction 224 may also include a time stamp 230. The time stamp 230 may indicate one or both of the time at which the available files 120 were available and the time at which the file available transaction 224 was uploaded to the blockchain 142.

In certain implementations, the file available transaction 224 may act as a triggering action for a batch job 106. For example, the client machine 102 may be configured to monitor the blockchain 142 for file available transactions 224 indicating that available files 120 are available to the client machine 102 for download. After detecting such a file available transaction 224, the client machine 102 may cause the batch job executor 104 to execute a batch job 106 corresponding to the available files 120.

The transaction generator 122 of the server machine 116 may also generate a request fulfillment transaction 232 upon completion (e.g., successful completion or failed completion) of a file transfer request received from the client machine 102. The request fulfillment transaction 232 includes a request result 233. Similar to the batch job result 204, 214, 216, the request result 233 may identify a request received from the client machine 102 and the corresponding result of processing that request. For example, the request result 233 indicates a successfully completed result and available files 120 provided in connection with the request. In instances where the server machine 116 is unable to successfully complete the request, the request result 233 may indicate a failure to complete the request, along with additional information indicating the level of completion of the request (e.g., the subset of the available files 120 that were successfully provided). In such instances, the request result 233 may also indicate an error or detected cause of failure for the request (e.g., a network error of the network 156, and unavailable client machine 102, or file corruption of one or more of the available files 120).

The request fulfillment transaction 232 may also include file information 234 corresponding to the available files 120 provided while fulfilling a request received from the client machine 102. Similarly, the request fulfillment transaction 232 includes a file hash 236, which may be calculated based on the available files 120 provided while fulfilling the received request. In implementations where the server machine 116 is unable to provide all of the requested available files, the file information 234 and/or the file hash 236 may indicate to be calculated based on those files that were successfully transferred while filling the request.

The request fulfillment transaction 232 may further include a time stamp 240 indicating one or more of the time at which the request was received from the client machine 102, the time at which the server machine 116 began fulfilling the request, the time at which the server machine 116 finished fulfilling the request, and the time at which the request fulfillment transaction 232 was generated.

Although not depicted, in certain implementations, one or both of the file available transaction 224 and the request fulfillment transaction 232 may include a file information hash similar to the file information hash 208, 220, 221 of the batch result transactions 202, 212.

Although the transactions 202, 212, 224, 232 are depicted as containing certain pieces of information, additional pieces of information may also be included in certain implementations. Relatedly, in certain implementations, one or more pieces of information depicted may be excluded from the transactions.

Figure 3:
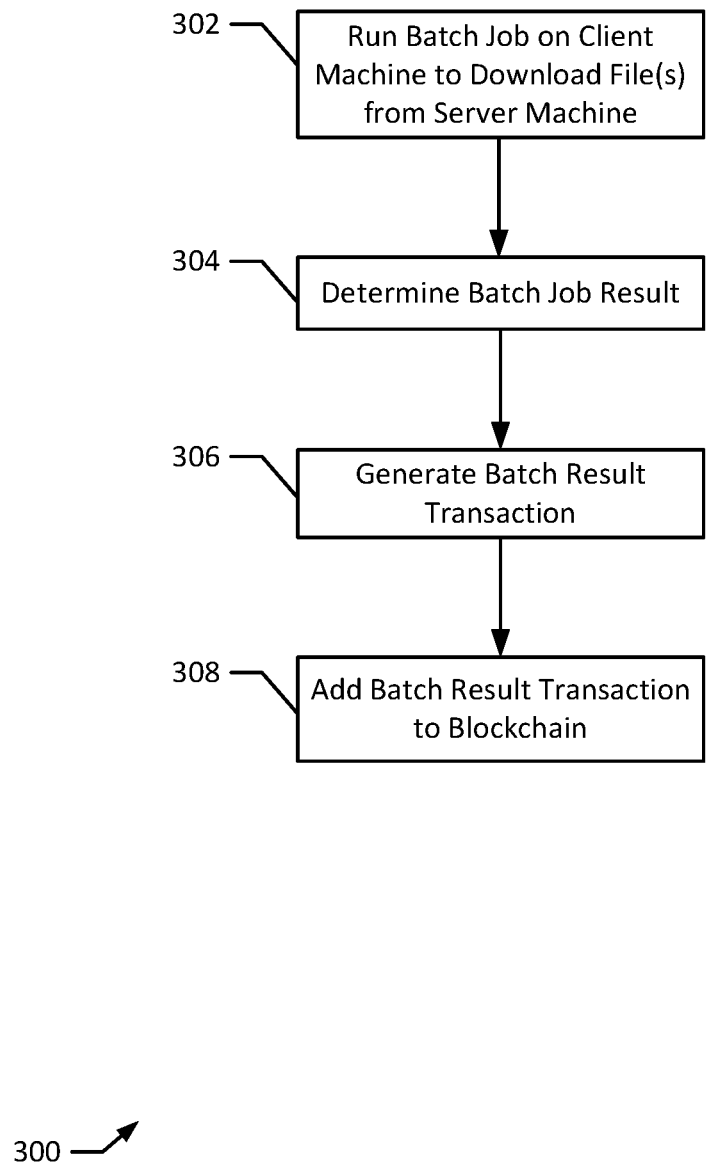
FIG. 3 illustrates a method according to an exemplary embodiment of the present disclosure.

FIG. 3 depicts a method 300 according to an exemplary embodiment of the present disclosure. The method 300 may be performed by the client machine 102 to execute a batch job 106 and generate a batch result transaction 110, 144, 202, 212 corresponding to be executed batch job 106 for upload to a blockchain 142. The method 300 may be implemented on a computer system, such as the system 100. For example, the method 300 may be implemented by the client machine 102, including the batch job executor 104 and/or the transaction generator 108. The method 400 may also be implemented by a set of instructions stored on a computer readable medium that, when executed by a processor, cause the computer system to perform the method. For example, all or part of the method 300 may be implemented by the CPU 114 and the memory 112. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 begins with running a batch job on the client machine to download a file or files from the server machine (block 302). For example, the client machine 102 may run a batch job 106 to download available files 120 from the server machine 116. As explained above, the batch job 106 may execute within a batch job executor 104 of the client machine to download the available files 120 from file transfer system 118 of the server machine 116 over a network 156 according to a file exchange protocol.

The client machine may then determine a batch job result (block 304). For example, the batch job executor 104 may determine a batch job result 204, 214, 216 of the batch job 106. The batch job result 204, 214, 216 may indicate whether the batch job executor 104 successfully executed batch job 106. If execution of the batch job 106 failed, the batch job result 204, 214, 216 may indicate one or more errors detected by the client machine 102 and/or a level of partial progress of execution of the batch job 106 (e.g., a subset of the available files 120 that were successfully downloaded).

The client machine may then generate a batch result transaction (block 306). For example, a transaction generator 108 of the client machine 102 may generate a batch result transaction 110, 202, 212 corresponding to the batch job 106. As explained above, the batch result transaction 110, 202, 212 may include information regarding the attempted execution of the batch job 106, such as the batch job result 204, 214, 216, a file hash 206, 218, 219, a file information hash 208, 220, 221 and/or a time stamp 210, 222, 223. Additionally, as further explained above, in instances where more than one batch job 106 executes between transaction generation intervals of the transaction generator 108, the transaction generator 108 may generate a batch result transaction 212 corresponding to more than one batch job 106. In certain implementation, in addition to the information depicted in FIG. 2, the client machine 102 may request and/or receive a unique identifier for each execution of a batch job 106. This unique identifier may then be included in the batch result transaction 110, 202, 212 for future verification of which batch job execution and/or file transfer request(s) the batch result transaction 110, 202, 212 corresponds to. In certain implementations, the transaction generator 108 may hash the unique identifier according to the hashing algorithm prior to inclusion within the batch result transaction 110, 202, 212.

The client machine may then add the batch result transaction to a blockchain (block 308). For example, the transaction generator 108 may add the batch result transaction 110, 202, 212 to the blockchain 142. To add the batch result transaction 110, 202, 212 to the blockchain 142, the transaction generator 108 and/or the client machine 102 may transmit the batch result transaction 110, 202, 212 to the blockchain 142 via the network 154. One or more nodes 148, 150, 152 implementing the blockchain 142 may receive the batch result transaction 110, 202, 212. One or more of the nodes 148, 150, 152 may then verify the authenticity of the transaction according to a consensus algorithm. Upon reaching consensus, the nodes 148, 150, 152 may then add the batch result transaction 110, 202, 212 to the blockchain 142.

In certain implementations, adding the batch result transaction 110, 202, 212 to the blockchain 142 may also involve replacing one or more previously-added transactions on the blockchain 142 or a portion of one or more previously-added transactions. For example, a newly-added batch result transaction 110, 202, 212 may replace a previously-added transaction on the blockchain 142 (e.g., a previously-added batch result transaction 110, 144, 202, 212, file available transaction 124, 146, 224, and/or request fulfillment transaction 232) after at least one of (i) a predetermined period of time has passed since the previously-added transaction was added to the blockchain 142, (ii) a predetermined number of transactions have been added to the blockchain 142 after the previously-added transaction, or (iii) a storage space taken up by the previously-added transaction and subsequent transactions on the blockchain exceeds a predetermined threshold (e.g., a storage threshold determined based on one or more of a cost of storing transaction on the blockchain 142 and a size of available storage on the blockchain 142). Replacing the previously-added transactions may include one or more of removing the previously-added transaction, overwriting the previously-added transaction, and overriding the previously-added transaction. For example, the newly-added batch result transaction 110, 202, 212 may replace a previously-added transaction by manipulating one or more variables associated with a smart contract running on the blockchain 142 (e.g., a public blockchain such as Ethereum®). In such an example, the smart contract may include a string field storing the batch job result(s) 204, 214, 216 added by the last-uploaded batch result transaction 110, 144, 202, 212 and adding the newly-added batch result transaction 110, 202, 212 to the blockchain 142 may overwrite the string field with the batch job result(s) 204, 214, 216 of the newly-added batch result transaction 110, 202, 212. In another example, the smart contract may store a list of batch job results 204, 214, 216 of previously-uploaded batch result transactions 110, 144, 202, 212 and adding the newly-added batch result transaction 110, 202, 212 may append the corresponding batch job result 204, 214, 216 to the list. In certain implementations, the list may be limited to a certain threshold number of batch job results 204, 214, 216 or to the batch job results 204, 214, 216 from a certain number of batch result transactions 110, 144, 202, 212. In such implementations, the smart contract may remove the oldest batch job result 204, 214, 216 or the batch job result(s) 204, 214, 216 corresponding to the oldest batch result transactions 110, 144, 202, 212 when the threshold is reached (e.g., by adding the newly-added batch result transaction 110, 202, 212).

Once stored on the blockchain 142, the batch result transaction 110, 202, 212 may be available to the server machine 116. For example, should any issue or dispute arise with the execution of the batch job 106, the server machine 116 may retrieve the batch result transaction 110, 202, 212 to verify one or more aspects of the successful or failed execution of the batch job 106. For example, the server machine 116 may review the batch job result 204 to verify whether the batch job executor 104 receive all of the available files 120. To further verify that all available files 120 are retrieved, the server machine 116 may compare a file hash 206, 218, 219 of the batch result transaction 110, 202, 212 against the file hash calculated by the server machine 116 of the available files 120. As discussed above, if the file hash 206 from the batch result transaction 110, 202, 212 differs from the file hash calculated by the server machine 116, the server machine 116 may determine that there is an error in the files received by the client machine 102. The server machine 116 may perform a similar comparison in regards to the file information hash 208. The server machine 116 may further compare the time stamp 210 of the batch result transaction 110, 202, 212. For example, if the time stamp 210 contains a time at which the batch job 106 request to the available files 120, the server machine 116 may compare the indicated time against a time at which the same request was received by the file transfer system 118. A discrepancy between the time stamp 210 and the time of request receivables for the file transfer system 118 may indicate an error (e.g., network error of the network 156).

Figure 4:
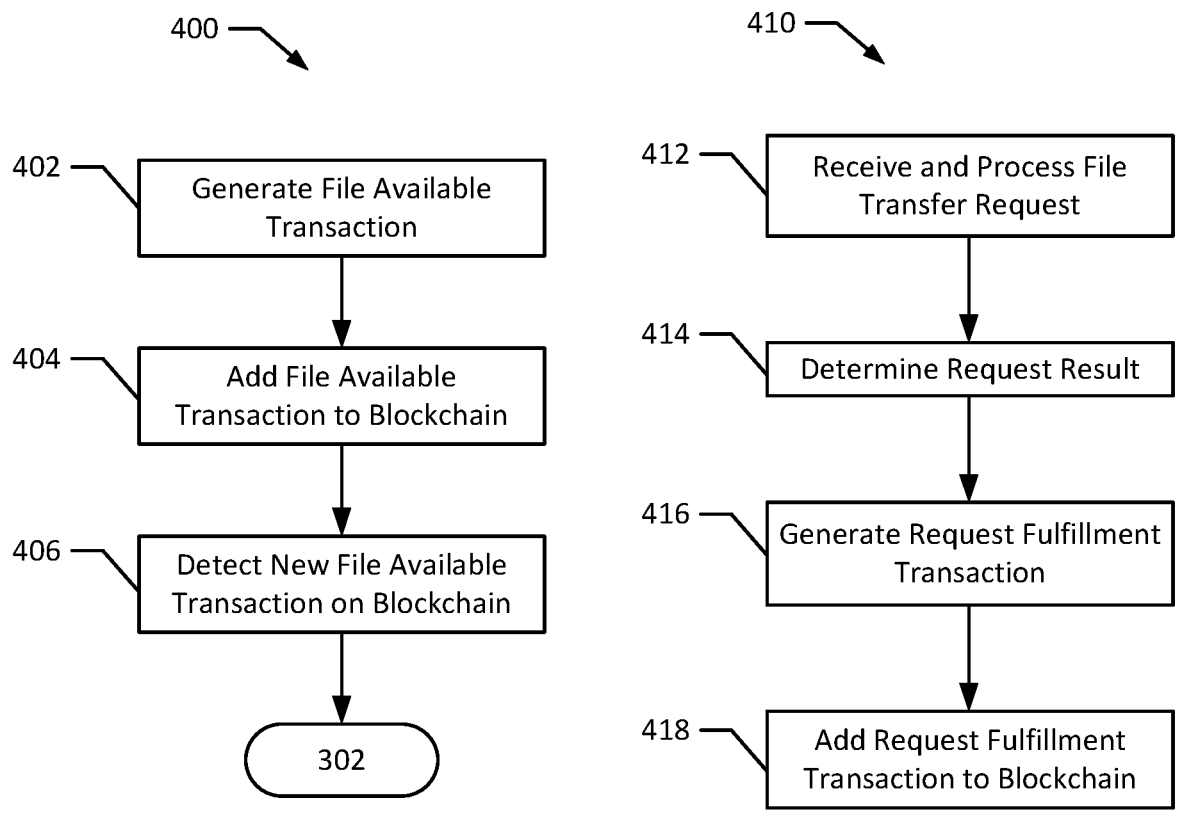
FIG. 4 illustrates methods according to exemplary embodiments of the present disclosure.

FIG. 4 depicts methods 400, 410 according to exemplary embodiments of the present disclosure. The method 400 may be performed by the system 100 to generate and detect the file available transaction 124, 146, 224 corresponding to available files 120 of the server machine 116. The method 400 may be implemented on a computer system, such as the system 100. For example, method 400 may be implemented by the client machine 102 and the server machine 116. The method 400 may also be implemented by a set of instructions stored on a computer readable medium that, when executed by a processor, cause the computer system to perform the method. For example, all or part of the method 400 may be implemented by the CPUs 114, 128 and the memories 112, 126. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 begins with a server machine generating a file available transaction (block 402). For example, the transaction generator 122 of the server machine 116 may generate a file available transaction 124, 224. As described in connection with FIG. 2, the file available transaction 124, 224 may include information regarding the available files 120 of the file transfer system 118, such as file information 226, a file hash 228, and a time stamp 230. The transaction generator 122 may generate the file available transaction 124 responsive to determining that new available files 120 are available in the file transfer system 118. For example, the server machine 116 may receive new files 138, 140 of the server database 136 and/or an indication that one or more files 138, 140 stored within the server database 136 should be made available for client download. The available files 120 may be indicated with a corresponding client machine 102 or organization with permission to download the available files 120. Such information may be incorporated into the file information 226 as described above. When the server machine 116 receives an indication that new files 138, 140 are to be made available as available files 120 of the file transfer system 118, the server machine 116 may direct the transaction generator 122 to generate a file available transaction 124, 224.

The server machine may then add the file available transaction to a blockchain (block 404). For example, the transaction generator 122 of the server machine 116 may add the file available transaction 124, 224 to the blockchain 142. As with the batch result transaction 110, 202, 212, the transaction generator 122 may transmit the file available transaction 124, 224 to one or more of the nodes 148, 150, 152 implement in the blockchain 142 via the network 154. The nodes 148, 150, 152 may then verify the file available transaction 124, 224 according to the consensus algorithm and, once verified, may add the file available transaction 124, 224 to the blockchain 142. Similar to block 308, adding the file available transaction 124, 224 to the blockchain 142 may also involve replacing one or more previously-added transactions on the blockchain 142. In particular, each of the transaction replacement examples discussed in connection with block 308 may also apply when adding the file available transaction 124, 224 to the blockchain 142.

The client machine may then detect a new file available transaction on the blockchain (block 406). For example, the client machine 102 may detect the new file available transaction 124, 224 on the blockchain 142. To detect a new file available transaction 124, 224, the client machine 102 may monitor the blockchain 142 for new file available transactions 124, 224 corresponding to available files 120 available for download by the client machine 102. For example, in implementations where the file available transaction 124, 224 includes file information 226, the client machine 102 may review the file information 226 for an indication that the client machine 102 or a related organization has permission to access the corresponding available files 120 (e.g., a device identifier, user credentials, organization identifier). Upon detecting such a file available transaction 124, 224, the client machine 102 may determine that there are new available files 120 on the server machine 116.

After determining the available files 120, the client machine 102 may identify and execute a corresponding batch job 106 to download the available files 120 from the server machine 116. For example, the client machine 102 may proceed with performing the method 300, beginning with block 302 as depicted in FIG. 4.

By storing the file available transaction 124, 224 on the blockchain 142, the client machine 102 may be able to rely on a publicly-auditable record of when the available files 120 were available for download from the server machine 116. Such a public record may ease review of failed batch job executions, as the available file time and corresponding details are viewable by both parties. Additionally, in implementations where the file available transaction 124 includes, e.g., a file hash 228, the client machine 102 may be able to validate the files received during execution of the batch job 106 without relying on further information from the server machine 116. For example, after receiving the files from the server machine 116, the client machine 102 may calculate its own file hash of the received files (e.g., the file hash 206, 218, 219 included in the batch result transaction 110, 202, 212). The client machine 102 may then compare the calculated file hash for the received files with the file hash 228 of the available files 120 included within the file available transaction 224. Accordingly, errors in the execution of the batch job 106 and/or the received files from the server machine 116 may be detected earlier and automatically based on publicly-available transactions on the blockchain 142. Additionally, should disputes arise later about the success or failure of a batch job 106, the file hash 228 of the file available transaction 224 may be compared with the file hash 206, 218, 219 of a corresponding batch result transaction 110, 202, 212 to determine whether the underlying issue was an error in one or more of the received files. Such a record may help pinpoint and more quickly resolve file exchange errors and disputes without relying on the private logs 105, 119 of either the client machine 102 or the server machine 116.

The method 410 may be performed by the server machine 116 to receive and process a request for available files 120 from a client machine 102 and to generate a corresponding request fulfillment transaction 232 for upload to a blockchain 142. The method 410 may be implemented on a computer system, such as the system 100. For example, the server machine 102, including the file transfer system 118 and the transaction generator 122. The method 410 may also be implemented by a set of instructions stored on a computer readable medium that, when executed by a processor, cause the computer system to perform the method. For example, all or part of the method 410 may be implemented by the CPU 128 and the memory 126. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 410 begins with the server machine receiving and processing the file transfer request (block 412). For example, the file transfer system 118 of the server machine 116 may receive file transfer request from the client machine 102. The file transfer request may request that the file transfer system 118 transfer one or more available files 120 to the client machine 102 according to the file exchange protocol. The file transfer system 118 may process the file transfer request according to the file exchange protocol. For example, the file transfer system 118 may transfer the available files 120 to the client machine 102 via the network 156.

The server machine may then determine a request result for the file transfer request (block 414). For example, the file transfer system 118 may determine a request result for the attempted transfer of the available files 120 to the client machine 102. Similar to the batch job result 204, 214, 216, if the file transfer request is successfully processed, the request result may indicate a successful transfer. If, however, an error occurs while processing the file transfer request, the request result may indicate that the file transfer request was not successfully processed and may indicate one or more errors (e.g., a network error of the network 156, the client availability error of the client machine 102, a file corruption error of one or more of the available files 120) detected while processing the file transfer request.

The server machine may then generate a request fulfillment transaction (block 416). For example, the transaction generator 122 may generate a request fulfillment transaction 232 based on the processing of the file transfer request. As described in connection with FIG. 2, the request fulfillment transaction 232 may include information regarding the success or failure of processing the file transfer request, such as the request result 233, file information 234, a file hash 236, and time stamp 240. In certain implementations where the file transfer request cannot be completely processed, but where a subset of the available files 120 are successfully provided to the client machine 102, the request fulfillment transaction 232 may be generated to include file information 234 and/or a file hash 236 of the successfully-provided files. Furthermore, in instances where more than one file transfer request is processed in between request fulfillment transaction 232 generation, multiple file transfer requests may correspond to the generated request fulfillment transaction 232, similar to the result transaction 212 that corresponds to multiple batch jobs 106. In certain implementations, in addition to the information depicted in FIG. 2, the server machine 116 may provide a unique identifier for each received file transfer request (e.g., at the request of a client machine 102). This unique identifier may then be included in the request fulfillment transaction 232 for future verification of exactly which batch job execution and/or file transfer request corresponds to the request fulfillment transaction 232. In certain implementations, the transaction generator 122 may hash the unique identifier according to the hashing algorithm prior to inclusion within the request fulfillment transaction 232.

The server machine may then add the request fulfillment transaction to a blockchain (block 418). For example, the transaction generator 122 of the server machine 116 may add the request fulfillment transaction 232 to the blockchain 142. As with the batch result transaction 110, 202, 212 and the file available transaction 124, 224, the transaction generator 122 may transmit the request fulfillment transaction 232 to one or more the nodes 148, 150, 152 implementing the blockchain 142 via the network 154. The nodes 148, 150, 152 may then verify the request fulfillment transaction 232 according to the consensus algorithm and, once verified, may add the request fulfillment transaction to the blockchain 142. Similar to block 308, adding the request fulfillment transaction 232 to the blockchain 142 may also involve replacing one or more previously-added transactions on the blockchain 142. In particular, each of the transaction replacement examples discussed in connection with block 308 may also apply when adding the request fulfillment transaction 232 to the blockchain.

Once stored on the blockchain 142, the request fulfillment transaction 232 may be available to the client machine 102. For example, should an issue or dispute arise regarding the execution of the batch job 106 and/or processing a file transfer request corresponding to a batch job 106, the client machine 102 may download and inspect the information contained within the request fulfillment transaction 232 to determine the cause of the error. For example, the client machine 102 may analyze the request result 233 against a batch job result 204, 214, 216 for the batch job 106 to determine whether the server machine 116 determined the same result while processing the file transfer request as the client machine 102 while executing the batch job 106. As another example, the client machine 102 may compare the file hash 236 of the request to fulfillment transaction 232 against a file hash 206, 218, 219 calculated based on the files receivable executing the batch job 106. If the file hashes 236, 206, 218, 219 differ, the difference may indicate that the files transmitted by the server machine 116 differ from the files received by the client machine 102 (e.g., one or more files are missing and/or corrupted). A similar comparison may be performed using the file information 234 of the request to fulfillment transaction 232 and the file information of the files received by the client machine 102.

Figure 5:
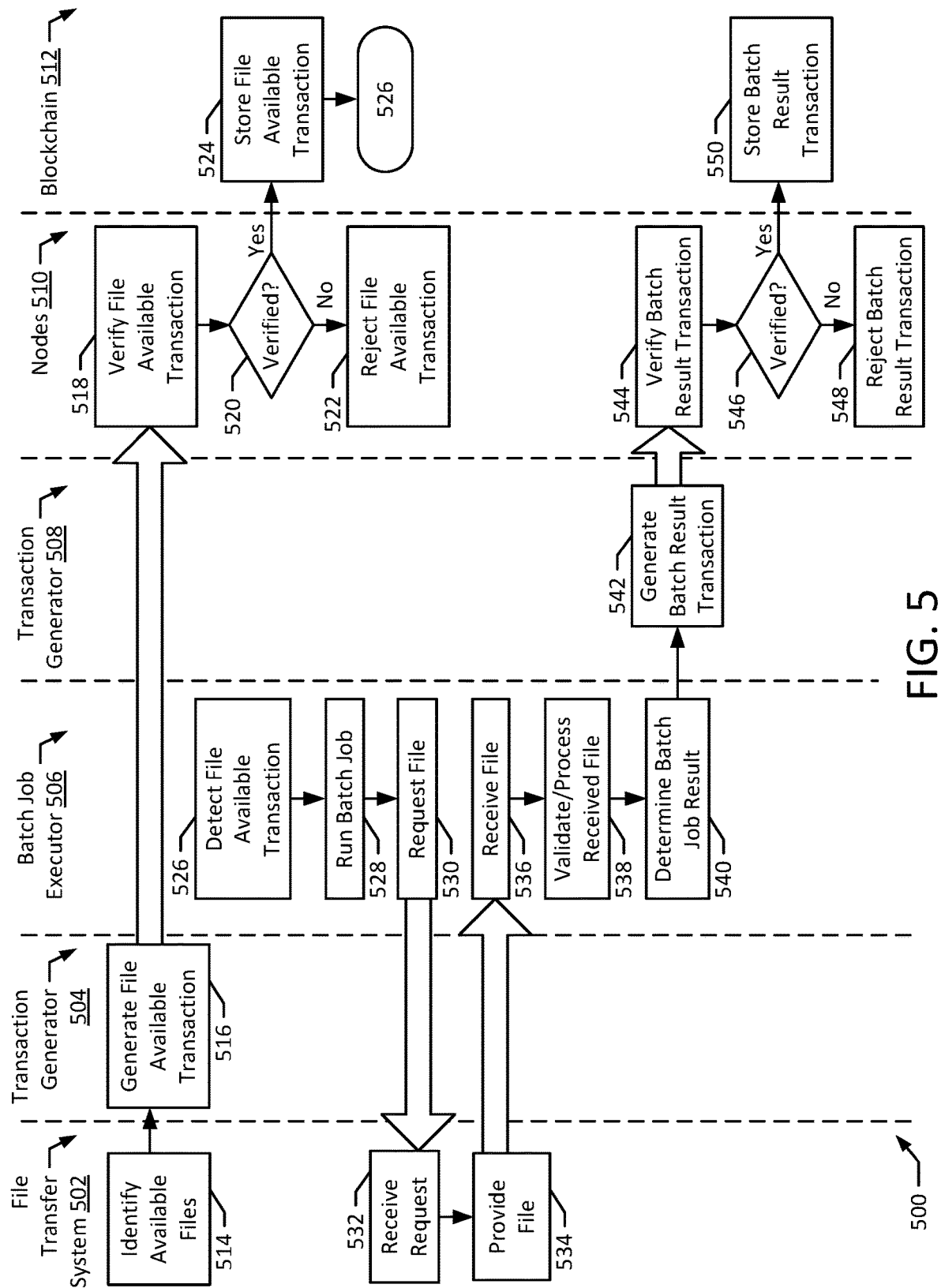
FIG. 5 illustrates a method according to an exemplary embodiment of the present disclosure.

FIG. 5 depicts a method 500 according to an exemplary embodiment of the present disclosure. The method 500 may be performed by the system 100 to exchange files between a client machine 102 and a server machine 116 according to a file exchange protocol and generate and upload transactions to a blockchain 142 reflecting the result of the file exchange operations.

The method 500 may be implemented on a computer system, such as the system 100. For example, method 500 may be implemented by the client machine 102, the server machine 116, the blockchain 142, the nodes 148, 150, 152, the client database 130, and/or the server database 136. The method 500 may also be implemented by a set of instructions stored on a computer readable medium which, when executed by a processor, cause the computer system to perform the method. For example, all or part of the method 500 may be implemented by the CPUs 114, 128 and the memories 112, 126. Although the examples below are described with reference to the flowchart illustrated in FIG. 5, many other methods of performing the acts associated with FIG. 5 may be used. For example, the order of some of the blocks may be changed, certain blocks may be combined with other blocks, one or more the blocks may be repeated, and some of the blocks described may be optional. In particular, one or more of blocks 514-526 may be optional in certain implementations.

The method 500 includes a file transfer system 502, a transaction generator 504, a batch job executor 506, a transaction generator 508, nodes 510, and a blockchain 512. The method 500 may be performed by the system 100. For example, the file transfer system 502 may be an implementation of the file transfer system 118, the transaction generator 504 may be an implementation of the transaction generator 122, batch job executor 506 may be an implementation of the batch job executor 104, the transaction generator 508 may be an example implementation of the transaction generator 108, the nodes 510 may be an example implementation of the nodes 148, 150, 152, and the blockchain 512 may be an example implementation of the blockchain 142.

The method 500 begins with the file transfer system 502 identifying available files 120 (block 514). For example, the file transfer system 502 may receive an indication that one or more files stored within a server database 136 of the server machine 116 are available for download by corresponding client machines 102. As another example, the available files 120 may represent a large amounts of data for processing by the client machine 102 (e.g., operational data for generating a regular report).

The file transfer system 502 may send information regarding the available files 120 to the transaction generator 504, which may generate a file available transaction 124, 224 (block 516). The file available transaction 124, 224 may include information regarding the available files 120, such as file information 226 and a file hash 228. In certain implementations, where the available files 120 are too large to quickly hash using a hashing algorithm, the file hash 228 may be generated based on a subset of the available files 120. The file information 226 may identify the available files 120 and the corresponding client machine 102 with permission to download the available files 120.

The transaction generator 504 may transmit the file available transaction 124, 224 to the nodes 510 for storage on the blockchain 512. After receiving the file available transaction 124, 224, the nodes 510 may verify the file available transaction 124, 224 according to a consensus algorithm of the blockchain 512. For example, one or more of the nodes 510 may collect the file available transaction 124, 224 into a block of other transactions and may generate consensus according to the consensus algorithm based on the block of transactions. In implementations where the blockchain 512 is implemented as a private blockchain, the file available transaction 124, 224 may be gathered into blocks corresponding to other transactions (e.g., other transactions generated by other server machines 116 and/or client machines 102 utilizing the private blockchain 512). In other implementations where the blockchain 512 is a public blockchain, the nodes 510 may gather the file available transaction 124, 224 into the block with other transactions unrelated to the system 100 and file exchange operations. For example, the nodes 510 may collect the file available transaction 124, 224 with other blockchain transactions such as crypto currency transactions and/or smart contract transactions.

If the nodes 510 determine that the file available transaction 124, 224 cannot be verified (block 520), the nodes may reject the file available transaction 124, 224 (block 522). This rejection may help prevent fraudulent or unsanctioned parties from adding deceptive or falsified transactions to the blockchain 512.

If, on the other hand, the nodes 510 determine that file available transaction is verified (block 520), the nodes 510 may store the file available transaction 124, 224 on the blockchain 512 (block 524). The nodes 510 may each store a copy of the blockchain 512, or a copy of a subset of the blockchain 512. In such implementations, the nodes 510 may store the file available transaction 124, 224 on the blockchain 512 by appending the file available transaction 124, 224 to each node's 510 respective copy of the blockchain 512. In implementations where the file available transaction 124, 224 is grouped with a block of other transactions, the nodes 510 may append the block of transactions to the copies of the blockchain 512.

Then, the batch job executor 506 may detect a file available transaction, as discussed above in connection with block 406 of the method 400 (block 526). The batch job executor 506 may accordingly run a batch job 106 corresponding to the available files 120 indicated in the file available transaction 124, 224. For example, the batch job executor 506 may correspond to the client machine 102 responsible for generating the report based on the data provided in the available files 120. In executing the batch job 106, the batch job executor 506 may request the available files 120 (block 530). For example, the batch job executor 506 may generate a file transfer request and transmit the file transfer request to the file transfer system 502 of the server machine 116. The file transfer system 502 may receive the request (block 532). The file transfer system 502 may then process the request by identifying the associated available files 120 and providing the available files 120 for download (block 534). The batch job executor 506 may then proceed with receiving the available files 120 (block 536). After receiving the files from the file transfer system 502, the batch job executor 506 may validate the received files (block 538) and determine the batch job result (block 540). For example, the batch job executor 506 may analyze the received files to determine whether the received files meet one or more expected characteristics. For example, in generating the report, the client machine 102 may expect the received files to be of a certain size, or to contain a certain number of files, or to include files with a certain naming convention. The batch job executor 506 may thus analyze the received files to determine whether the received files meet these expectations. If the batch job executor 506 determines that the received files do not meet one or more of the expectations, the batch job executor 506 may determine that the batch job 106 was not executed successfully. Similarly, the batch job executor 506 may analyze the received files for one or more corrupted or incomplete files. If the batch job executor 506 detects any corrupted or incomplete files, the batch job executor 506 may determine that the batch job 106 was not successfully completed. In the above example where the client machine 102 is downloading a large number of files from the server machine 116, the network 156 may experience a network error, causing one or more of the available files 120 transferred to the client machine 102 to corrupt during download, or to fail to download. The batch job executor 506 may analyze the received files according to one or more of the above rules and may determine that one or more of the expected files is missing and/or that one or more of the received files is incomplete and may correspondingly determine that the batch job 106 was not executed successfully. However, in other implementations where no such pre-existing rules exist, the batch job executor 506 may validate the received files based on the file available transaction 124, 224. For example, the batch job executor 506 may calculate a file hash of the received files and may compare the file hash of the received files to the file hash 228 of the file available transaction 224. If the batch job executor 506 determines that the file hashes differ, the batch job executor may determine that the batch job 106 was not successfully completed. While processing the received files, the client machine 102 may store the files in the client database 130 for future use (e.g., in preparing the report).

The transaction generator 508 and then generate a batch result transaction 110, 202, 212 (block 542). For example, transaction generator 508 may generate the batch result transaction 110, 202, 212 to include a batch job result 204, 214, 216 indicating the missing and/or corrupted files identified at block 538. The transaction generator 508 may then transmit the batch result transaction 110, 202, 212 to the nodes 510 for storage on the blockchain 512. The nodes 510 may then verify the batch result transaction 110, 202, 212 (block 544). If the nodes 510 successfully verify the batch result transaction 110, 202, 212 (block 546), the nodes 510 may store the batch result transaction 110, 202, 212 on the blockchain 512 (block 550). If the nodes 510 cannot successfully verify the batch result transaction 110, 202, 212 (block 546), the nodes 510 may reject the batch result transaction 110, 202, 212 (block 548). The blocks 544-550 may be performed similarly to the blocks 518-524, described above.

By performing the method 500, the client machine 102 may alert the server machine 116 to an unsatisfactory result of executing the batch job 106. Namely, the client machine 102 may identify the detected errors and unsuccessfully-received files on a blockchain 512 in a publicly-available and publicly-auditable way. Accordingly, when the server machine 116 detects the batch result transaction 110, 202, 212 on the blockchain 512, or the organization associated with the client machine 102 alerts the organization associated with the server machine 116 to one or more errors, the relevant information is available such that the server-side organization does not need to coordinate with the client-side organization to download the client log 105 from the client machine 102. Similarly, in implementations where the server machine 116 uploads a file available transaction 124, 224, the client machine 102 may be able to more quickly identify errors in the received files. In both instances, network usage may be reduced for resolving questions regarding the performance of batch jobs and any underlying issues therein. Also, because the information is publicly available, there may be less latency in querying and determining the information. Furthermore, even in instances where the errors are not detected soon after execution of the batch job 106, the transactions stored on the blockchain 512 provide records for review if the issue is detected in the future. Because the records are publicly available, this system reduces the cost and complexity of coordinating to determine the cause of an issue. Additionally, because the result are publicly reviewable, the client-side and server-side parties are not required to trust one another to review and provide adequate log file information. Relatedly, neither party may be required to provide access to their internal log files and/or secure system, reducing the risk of security breaches or inadvertent disclosure of confidential information.

Figure 6:
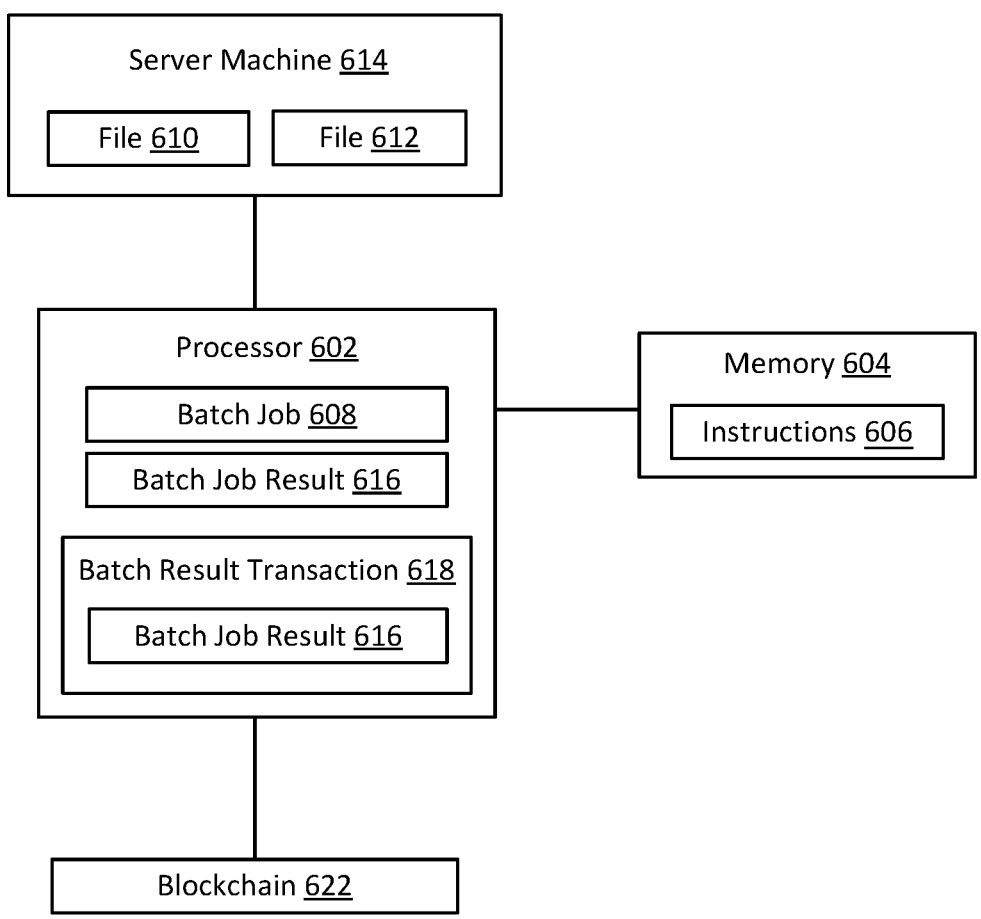
FIG. 6 illustrates a system according to an exemplary embodiment of the present disclosure.

FIG. 6 depicts a system 600 according to an exemplary embodiment of the present disclosure. The system 600 includes a processor 602 and a memory 604. The memory 604 stores instructions 606 which, when executed by the processor 602, cause the processor 602 to run a batch job 608 to download one or more files 610, 612 from a server machine 614 and determine a batch job result 616 of the batch job 608. The memory 604 also stores instructions 606 which, when executed by the processor 602, cause the processor 602 to generate a batch result transaction 618 including the batch job result 616 and add the batch result transaction 618 to a blockchain 622.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
 detecting, by a client machine over a public network, that a server machine has newly added a file available transaction to a public blockchain hosted by the server machine for the client machine, the file available transaction indicating file information that identify files available for download from the server machine by the client machine over a private network, different from the public network;
 running a batch job on the client machine to download the files from the server machine to the client machine over the private network;
 determining a batch job result of the batch job;
 generating, at the client machine, a batch result transaction including the batch job result; and adding, by the client machine over the public network, the batch result transaction to the public blockchain.

2. The method of claim 1, wherein generating the batch result transaction further comprises:
generating a file hash of at least a subset of the files; and
adding the file hash to the batch result transaction.

3. The method of claim 1, wherein the batch job result includes at least one result selected from the group consisting of a download result of the batch job, a validation result of the batch job, and a processing result of the batch job.

4. The method of claim 1, wherein the batch job result includes file information regarding at least a subset of the files.

5. The method of claim 4, wherein the file information includes one or more pieces of information selected from the group consisting of file names for each of the subset of the files, file sizes for each file included in the subset of the files, and a download time for each file included in the subset of the files.

6. The method of claim 4, wherein generating the batch result transaction further comprises:
generating a file information hash of the file information; and
adding the file information hash to the batch result transaction.

7. The method of claim 1, wherein the public blockchain is implemented by a plurality of nodes accessible to the client machine and the server machine over the public network, and not over the private network.

8. The method of claim 7, wherein a first subset of the nodes implementing the public blockchain is implemented by a first computing device affiliated with the client machine, and wherein a second subset of the nodes implementing the public blockchain is implemented by a second computing device affiliated with the server machine.

9. The method of claim 8, wherein a third subset of the nodes implementing the public blockchain is implemented by a third computing device affiliated with neither the client machine nor the server machine.

10. The method of claim 1, wherein transactions are added to the public blockchain at a transaction frequency, wherein the batch job executes at an execution frequency that is more frequent than the transaction frequency, and wherein generating the batch result transaction includes adding a plurality of batch job results to the batch result transaction.

11. The method of claim 1, further comprising:
replacing, by the client machine, an indication of the batch result transaction on the public blockchain after at least one of (i) a predetermined period of time has passed, (ii) a predetermined number of subsequent batch result transactions have been added to the public blockchain, or (iii) a storage space taken up by the batch result transaction and subsequent batch result transactions exceeds a predetermined threshold.

12. The method of claim 1, wherein the batch job downloads the files from the server machine according to the file transfer protocol (FTP).

13. A system comprising:
a processor; and
a memory storing instructions which, when executed by the processor, cause the processor to:
in response to detecting, over a public network, that a server machine has newly added a file available transaction to a public blockchain hosted by the server machine for a client machine, the file available transaction indicating file information that identify files available for download from the server machine by the client machine over a private network, different from the public network;
run a batch job on the client machine to download the files from the server machine to the client machine over the private network;
determine a batch job result of the batch job;
generate, at the client machine, a batch result transaction including the batch job result; and
add, by the client machine over the public network, the batch result transaction to the public blockchain.

14. The system of claim 13, wherein the memory stores further instructions which, when executed by the processor, cause the processor to:
generate a file hash of at least a subset of the files; and
add the file hash to the batch result transaction.

15. The system of claim 13, wherein the memory stores further instructions which, when executed by the processor, cause the processor to:
generate a file information hash of file information regarding at least a subset of the files; and
add the file information hash to the batch result transaction.

16. The system of claim 13, wherein transactions are added to the public blockchain at a transaction frequency, wherein the batch job executes at an execution frequency that is more frequent than the transaction frequency, and wherein the memory stores further instructions which, when executed by the processor, cause the processor to add a plurality of batch job result to the batch result transaction.

17. The system of claim 13, wherein the memory stores further instructions which, when executed by the processor, cause the processor to:
replace an indication of the batch result transaction on the public blockchain after at least one of (i) a predetermined period of time has passed, (ii) a predetermined number of subsequent batch result transactions have been added to the public blockchain, or (iii) a storage space taken up by the batch result transaction and subsequent batch result transactions exceeds a predetermined threshold.

18. A non-transitory, computer-readable medium storing instructions which, when executed by a processor, cause the processor to:
detect, over a public network, that a server machine has added a file available transaction for a client machine to a public blockchain hosted by the server machine, the file available transaction indicating file information identifying files that are newly available for download from the server machine by the client machine over a private network, different from the public network;
determine a batch job result of a batch job;
generate, at the client machine, a batch result transaction including the batch job result; and
add, by the client machine over the public network, the batch result transaction to the public blockchain.

* * * * *